United States Patent
Kimura

(10) Patent No.: US 6,913,050 B2
(45) Date of Patent: Jul. 5, 2005

(54) WHEEL WITH A SPRING UNIT

(75) Inventor: Yoshiaki Kimura, Toyota (JP)

(73) Assignee: Topy Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/902,825

(22) Filed: Aug. 2, 2004

(65) Prior Publication Data

US 2005/0006012 A1 Jan. 13, 2005

Related U.S. Application Data

(62) Division of application No. 10/329,525, filed on Dec. 27, 2002, now Pat. No. 6,796,345.

(30) Foreign Application Priority Data

Apr. 18, 2002 (JP) .......................................... 2002-116045

(51) Int. Cl.⁷ .............................................. B60B 15/04
(52) U.S. Cl. ............................ 152/13; 152/23; 152/156; 301/11.1
(58) Field of Search ................................. 152/6, 13, 17, 152/23, 47, 69, 87, 156, 151, 157, 158; 301/11.1, 11.2, 10.1, 95.11, 35.1; 295/7, 11, 12

(56) References Cited

U.S. PATENT DOCUMENTS

| | | | | |
|---|---|---|---|---|
| 1,068,582 A | * | 7/1913 | Graves | ........................ 152/13 |
| 1,349,339 A | | 8/1920 | Horne | |
| 1,533,566 A | | 4/1925 | Nantes | |
| 2,661,043 A | * | 12/1953 | Bables | ........................ 152/247 |
| 3,896,868 A | * | 7/1975 | Molitor | ........................ 152/13 |
| 4,241,775 A | | 12/1980 | Jackson | |
| 4,416,353 A | | 11/1983 | Ivanov | |
| 6,439,282 B1 | | 8/2002 | Kimura et al. | |
| 6,516,846 B2 | * | 2/2003 | Chiu | ........................ 152/158 |

* cited by examiner

Primary Examiner—Frantz F. Jules
(74) Attorney, Agent, or Firm—Pillsbury Winthrop Shaw Pittman LLP

(57) ABSTRACT

A wheel with a spring unit includes a rim, a disc and a plurality of spring units. Each spring unit is directed circumferentially and arranged in an annular space between the rim and the disc. Each spring unit includes at least one metal spring. The metal spring may be a coil spring or a leaf spring, and may be prestressed in compression or tension. To restrict the lateral relative movement between the rim and the disc, a pair of stopper ribs are disposed on opposite sides of the spring unit, or an axial movement stopper is disposed at axially outboard end of the wheel.

5 Claims, 17 Drawing Sheets

WHEEL WITH A SPRING UNIT

CROSS-REFERENCE TO RELATED APPLICATIONS

This is a Divisional Application of U.S. application Ser. No. 10/329,525, filed Dec. 27, 2002, now U.S. Pat. No. 6,796,345 which is based upon and claims the benefit of priority to Japanese Patent Application No. 2002-116045, filed Apr. 18, 2002, the entire contents of both of which are incorporated herein by reference.

BACKGROUND OF THE INVENTION

1. Field of the Invention

The present invention relates to a wheel with a spring unit for a vehicle.

2. Description of Related Art

A wheel including a rim, a disc and an elastic member connecting the rim and the disc is known. The wheel with the elastic member decreases a road noise of the vehicle, when for the elastic member, a rubber, a leaf spring having a wave, and a plurality of radially directed coil springs are used.

The wheel with the elastic member requires a spring force generating a radial force and a circumferential force for obtaining the aimed characteristic. The disc is biased toward a center of the rim by the radial spring force. The radial spring of the elastic member and a mass of the rim constitute a dynamic damper which decreases a road noise. The circumferential spring force transmits a drive and brake force between the disc and the rim.

The conventional wheel with the damper has the following A–F problems:

(A) The Distance Between the Rim and the Disc is Large.
① Rubber-Type Elastic Member The wheel with the elastic member obtains a necessary elastic force by the rubber. The spring constant of the rubber is determined so as to decrease a road noise at the vicinity of 100 Hz. When a vehicle load is imposed on the wheel, a large displacement is generated between the rim and the disc at an upper portion and a lower portion of the wheel. When the spring constant of the rubber is determined so as to decrease the road noise, the clearance between the rim and the disc is about 25 mm.

② Leaf Spring-Type Elastic Member

The leaf spring is fixed to the rim and the disc not by welding but by a rivet so as to prevent the spring from losing its elasticity due to heat of welding and to relax stress concentration which may be generated if the spring is fixedly coupled to the rim and the disc. The leaf spring may be coupled to the rim and the disc via metal retainers. As a result, a space for disposing the metal retainers is necessary. Further, a space for rivet-working is necessary between the inside and outside retainers. Furthermore, since the leaf spring deforms in a radial direction of the wheel also, it is necessary to provide a clearance for the deformation. Summing up these clearances, a necessary clearance between the rim and the disc is about 25 mm or more.

③ Other Spring-Type Elastic Member (Where an Axis of the Spring is Directed in a Radial Direction of the Wheel)

When the other-type spring is used with its axis directed in the radial direction of the wheel, a relatively large space is necessary to be provided between the rim and the disc in order to obtain a necessary durability of the spring. The necessary space is about 40 mm or more.

(B) The Reliability of the Elastic Member is Insufficient.
① Rubber-Type Elastic Member Consideration has to be taken to the durability because the durability of the rubber-type elastic member is affected by ultraviolet rays, ozone, salt, etc.

② Leaf Spring-Type Elastic Member

The leaf spring is twisted and plastically deformed receiving an excessively large lateral force and the spring characteristic becomes unstable. When twisted, a large local stress concentration will be generated in the leaf spring and the spring is likely to be broken. However, there are few examples used for the wheels, consideration of which is necessary.

(C) There is no Fail-Safe Mechanism in a Rotational Direction.

When the rubber member is broken, there is no engagement between the rim and the disc, and no drive and brake torque is transmitted between the rim and the disc.

(D) Cost is High.
① Rubber-Type Elastic Member

Equipment for conducting vulcanizing-adhesion is high in cost, and the time for conducting vulcanizing-adhesion is long.

② Leaf Spring-Type Elastic Member

A large retainer and a special spring are needed. Further, a relatively long time period is necessary for mounting the spring to the wheel. Therefore, the cost is high.

(E) Stability and Controllability are Relatively Low.
① Rubber-Type Elastic Member In a large amount of steering, since the rigidity of the elastic member is low in the steering direction, the steering force is absorbed at the elastic member and therefore, the tire cannot be steered by the same amount as the steering handle is rotated.

If the steering rigidity of the rear wheel is low, the rear wheel is steered in an opposite direction when the vehicle is turned, and the vehicle is over-steered.

In a small amount of quick steering, the steering is delayed due to a hysteresis generated by an internal friction of the rubber.

② Leaf Spring-Type Elastic Member

The rigidity of the leaf spring is high in the steering direction so long as a width of the leaf spring is large. However, cost is high.

(F) Regarding a Harmful Noise
① Leaf Spring-Type Elastic Member

Since the leaf spring is coupled to the rim and the disc by a rivet, a slippage happens at the rivet portion to cause a metal slippage noise.

② Other Spring-Type Elastic Member

In a case where an end of the spring directly contacts the rim and the disc, a noise is likely to be created. To suppress the noise, a retainer for receiving the end of the spring will be necessary, and the cost therefore will be high.

SUMMARY OF THE INVENTION

An object of the present invention is to provide a wheel with a spring unit capable of solving at least one of the above problems A–F.

BRIEF DESCRIPTION OF THE DRAWINGS

The above and other objects, features, and advantages of the present invention will become apparent and will be more readily appreciated from the following detailed description of the preferred embodiments of the present invention in conjunction with the accompanying drawings, in which.

DETAILED DESCRIPTION OF THE PREFERRED EMBODIMENTS

Figure 31:
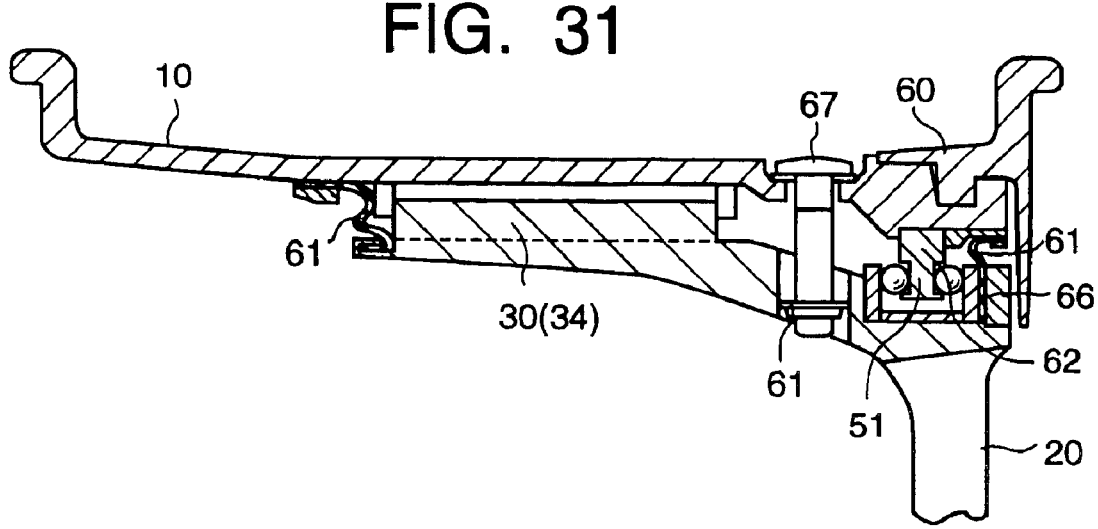
FIG. 31 is a cross-sectional view of a portion of a wheel with a spring unit according to Embodiment VIII of the present invention.
Figure 32:
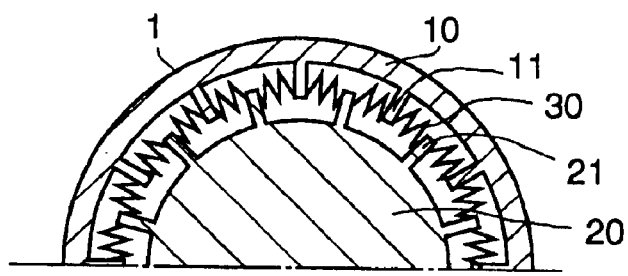
FIG. 32 is a schematic cross-sectional view of the wheel according to Embodiment I–VIII of the present invention.
Figure 33:
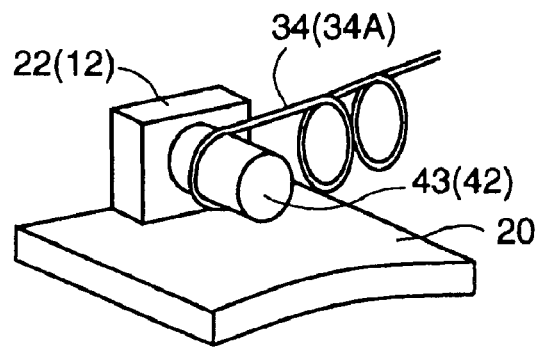
FIG. 33 is a perspective view of the spring unit of a hanger-type.

A wheel with a spring unit according to the present invention will be explained with reference to FIGS. 1–32, wherein FIG. 32 illustrates a scheme of the present invention and FIGS. 1–31 illustrate details thereof.

The wheel with a spring unit includes a rim 10, a disc 20 radially spaced from the rim 10 to form an annular space between the rim 10 and the disc 20, and a plurality of spring units 30 directed circumferentially and arranged in the annular space. The rim 10 includes a rim side rib protruding radially inwardly. The disc 20 includes a disc side rib protruding radially outwardly. Each of the plurality of spring units 30 includes a metal spring 34. Each of the plurality of spring units 30 has a first end engaging the rim side rib and a second, opposite end engaging the disc side rib.

The rim side rib includes either one of a rib 11 formed integrally with the rim 10 and a first member 12 fixed to the rim. The disc side rib includes either one of a rib 21 formed integrally with the disc 20 and a second member 22 fixed to the disc 20. The rim side rib 11, 12 and the disc side rib 21, 22 are engageable with each other in a wheel rotational direction.

The disc 20 may include a pair of stopper ribs 31 and 32. The pair of stopper ribs 31 and 32 are spaced from the rim side rib 11, 12 and the disc side rib 21, 22 in an axial direction of the wheel, and are arranged on opposite sides of the rim side rib 11, 12 and the disc side rib 21, 22 in the axial direction of the wheel.

The wheel may include a ring for lubrication 33 disposed between each of the pair of stopper ribs 31 and 32 and the rim side rib 11, 12.

The wheel may include a rubber bushing 50 disposed between each of the pair of stopper ribs 31 and 32 and the rim side rib 11, 12.

The wheel may include a ball bearing mechanism 51 including a ball 54 disposed between each of the pair of stopper ribs 31 and 32 and the rim side rib 11, 12.

The wheel may include an axial movement stopper 62 for stopping a relative axial movement between the rim 10 and the disc 20. The axial movement stopper 62 is disposed at an axially outboard end or the vicinity thereof of the wheel and radially between the rim 10 and the disc 20.

The axial movement stopper 62 may include a rubber bushing 63 operating a seal member 61. The rubber bushing 63 may have a U-shaped cross section or a double I-shaped cross section (including a rubber element fixed to each of opposite surfaces of a stopper rib 64).

The axial movement stopper 62 may include a flat bearing 51 which includes a ball 54, an annular casing 52, and a center plate 53.

The axial movement stopper 62 may include a cushion 66 for adjusting a pressure imposed on the flat bearing 51 and an annular rubber member 61 operating as an axially outboard seal of the wheel.

The axial movement stopper 62 may include a rubber bushing-type stopper, and a seal mechanism 61 may be disposed at each position of a valve portion, axially outboard of the plurality of spring units 30 and axially inboard of the plurality of spring units 30.

The axial movement stopper 62 may include a flat bearing-type stopper, and a seal mechanism 61 may be disposed at each position of a valve portion, axially outboard of the plurality of spring units 30 and axially inboard of the plurality of spring units 30.

The aforesaid A–F problems will be solved by the above wheel with the spring units 30 in the following way.

[I] Annular Arrangement of the Spring Units 30

The plurality of spring units 30 are annularly arranged in the annular space between the rim 10 and the disc 20. As illustrated in FIG. 32, an elastic force of the spring is directed in a circumferential direction of the wheel. The spring is given a prestress force of compression force or tensile force.

The springs are disposed on opposite sides of the rib 11 in the circumferential direction of the wheel and are used in pair so that the rib 11 is biased toward a center of opposite ribs 21 by the prestress force of the springs. When the paired springs are arranged annularly, the disc 20 is biased toward a center of the rim 10. This biasing force is used as a radial force for the elastic wheel.

Due to this structure, some of the aforesaid problems are solved in the following way.

a) Since the spring unit 30 is directed in the circumferential direction of the wheel, a space for operation of the spring can be provided in the circumferential direction of the wheel. As a result, a radial clearance between the rim 10 and the disc 20 is reduced to 10–12 mm. Problem A is solved.

b) Since all that is required to the spring unit 30 is an elastic force in one direction only, a well-known spring such as a coil spring and a leaf spring can be used, and a high reliability is obtained. Problem B is solved.

c) Since the plurality of spring units 30 have a common structure to each other, the spring cost is low. Problem D is solved.

d) Since the metal spring can be used, a steering delay due to an internal friction in the elastic member does not occur. Problem E is solved.

[II] An Engagement Mechanism Between the Rim and the Disc

Opposite ends of the spring unit 30 engage the ribs 11 and 21 which are in parallel with each other. The heights of the ribs 11 and 21 are determined such that the ribs 11 and 21 engage each other in the rotational direction of the wheel as illustrated in FIG. 32.

Even if the spring unit 30 is broken, a torque can be transmitted between the rim 10 and the disc 20 because ribs 11 and 21 engage each other in the rotational direction of the wheel. As a result, a fail-safe mechanism is assured. Problem C is solved.

[III] An Engagement Mechanism Between the Rim and the Disc (in a Case of a Hanger-Type Spring)

In the case of a tension spring, the spring 34, for example, the coil spring 34A may be engaged directly with a hanger 42 of a hanger bracket 12 fixed to the rim 10 and a hanger 43 of a hanger bracket 22 fixed to the disc 20, which will be illustrated in Embodiment 4 of the present invention.

Figure 34:
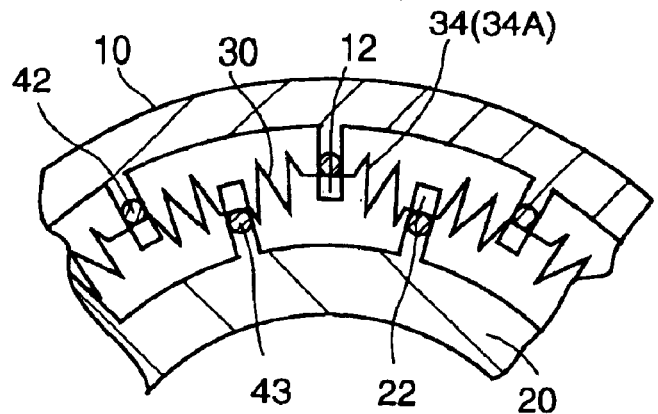
FIG. 34 is a schematic front elevational view of a portion of the wheel with the spring unit of the hanger-type of FIG. 33.

Since there are no parallel ribs 11 and 21 in the structure, height of the hanger brackets 12 and 22 are determined such that the hanger brackets 12 and 22 engage each other in the rotational direction of the wheel to assure a fail-safe mechanism in the rotational direction of the wheel as illustrated in FIG. 34.

[IV] Stopper Rib Structure

Figure 35:
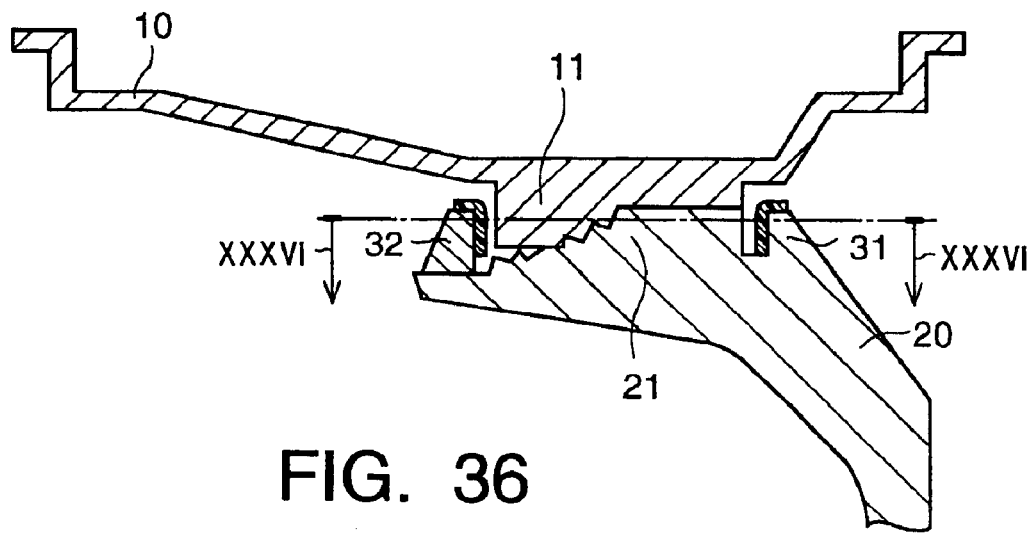
FIG. 35 is a cross-sectional view of the wheel with the spring unit and the stopper ribs.
Figure 36:
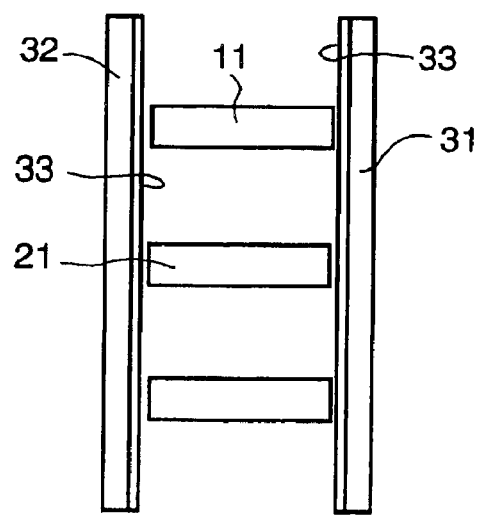
FIG. 36 is a cross-sectional view taken along line XXXVI—XXXVI of FIG. 35.

The stopper ribs 31 and 32 are disposed at opposite sides of the ribs 11 and 21 for receiving the spring force as illustrated in FIGS. 35 and 36. The stopper ribs 31 and 32 are a little spaced from the opposite ends of the ribs 11 and 21. One 31 of the stopper ribs 31 and 32 is integrally formed with the disc 20. The other 32 is a piece different from the disc 20, and after the spring unit 30 is mounted, the piece is mounted to and welded to the disc 20. The stopper ribs 31 and 32 may be formed or fixed to either of the disc 20 and the rim 10.

The ribs 11 and 21 or the brackets 12 and 22 are enclosed between the stopper ribs 31 and 32 in the axial direction of the wheel. By this structure, a movement between the rim 10 and the disc 20 in the axial direction of the wheel is regulated. As a result, a steering rigidity of the wheel is increased. Problem E is solved.

[V] Slippage Noise Suppression Mechanism a) Sliding Mechanism

As illustrated in FIG. 36, surfaces of the stopper ribs 31 and 32 facing the spring unit 30 are covered with a lubrication ring 33 made from polytetrafluoroethylene. Due to this structure, an axial clearance between the stopper rib and the spring unit is decreased, and a fretting abrasion due to sliding of the stopper ribs 31 and 32 with the parallel ribs 11 and 21 are suppressed. Also, slippage noise is decreased.

The lubrication ring 33 may be omitted, which will be described in Embodiment 2 of the present invention.

b) Rubber Bushing

Figure 37:
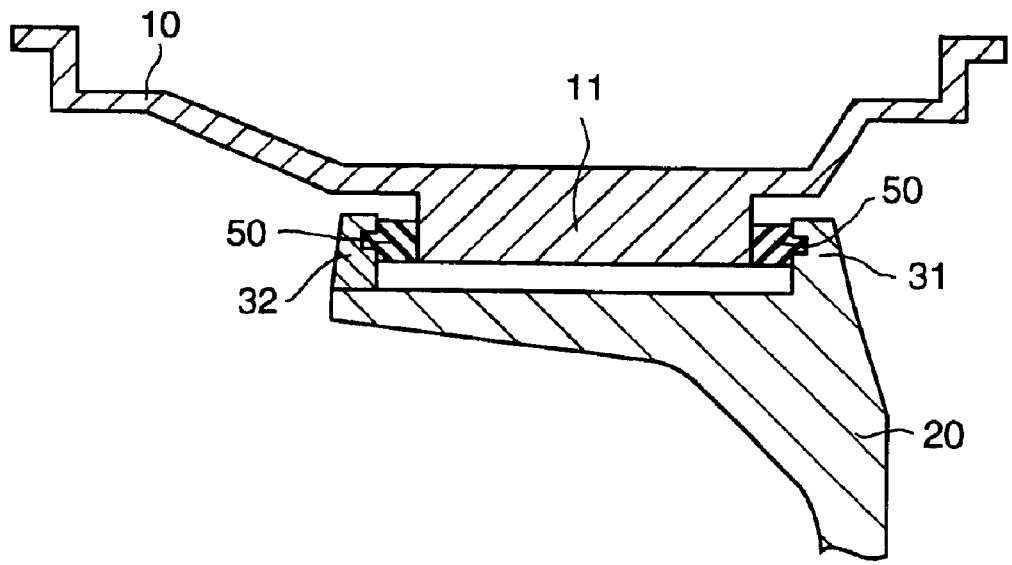
FIG. 37 is a cross-sectional view of a portion of the wheel with the spring unit having the rubber bushing.

Otherwise, as illustrated in FIG. 37, a rubber bushing 50 is provided between the stopper ribs 31 and 32 and the spring seat ribs 11 and 21 to prevent a frictional noise and a fretting abrasion. The stopper ribs 31 and 32 include a small hole where the rubber bushing 50 is fixed. The rubber bushing 50 may have a small length and a single protrusion to be inserted into one of the small holes of the stopper ribs 31 and 32, or the rubber bushing 50 may have a large length and a plurality of protrusions to be inserted into a plurality of small holes of the stopper ribs 31 and 32. The rubber bushing 50 is assembled to the wheel in the compressed state. An end of the rubber bushing 50 is pushed against the ribs 11 and 21 or the brackets. When the ribs 11 and 21 move relative to the stopper ribs 31 and 32, the end of the rubber bushing 50 pushed against the ribs 11 and 21 also moves accompanied by an elastic shear deformation of the rubber bushing 50. This structure will be described in Embodiment 5 of the present invention.

c) Ball Mechanism

Figure 38:
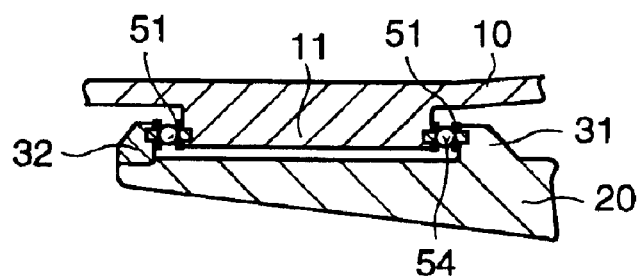
FIG. 38 is a cross-sectional view of a portion of the wheel with the spring unit having the ball mechanism.

Otherwise, as illustrated in FIG. 38, the ball 54 of the flat bearing 51 is disposed between the stopper ribs 31 and 32 and the spring seat ribs 11 and 21 so as to allow a relative movement between the stopper ribs 31 and 32 and the spring seat ribs 11 and 21 in the rotational direction of the wheel. Due to this structure, a resistance in the rotational direction is decreased to about 1/50 of that in the case of friction, and vibration and noise are decreased. Also, the rigidity in the axial direction of the wheel is increased. Problem F is solved. This structure will be described in Embodiment 6 of the present invention.

[VI] Structure of the Spring and the Retainer

Figure 39:
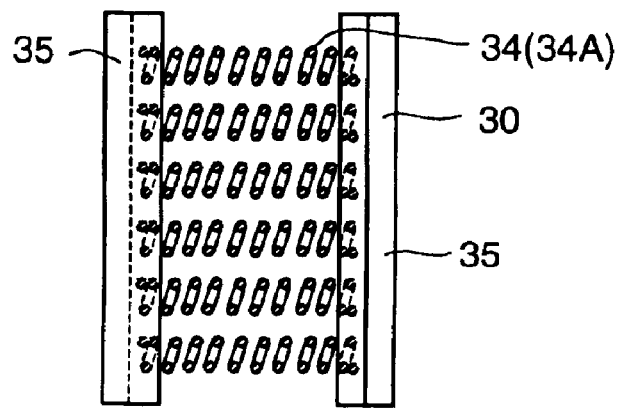
FIG. 39 is a plan view of the coil spring and the retainer in the case of a compression spring.
Figure 40:
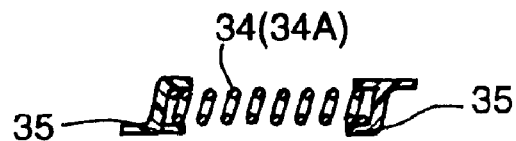
FIG. 40 is a front view of the coil spring and the retainer of FIG. 39.

In the case where the metal spring 34 is a compression coil spring 34A, as illustrated in FIGS. 39 and 40, a retainer 35 having a recess with a diameter matching the diameter of the spring 34 is used (Embodiment 1). By inserting the end of the spring 34 into the retainer 35, slippage of the spring relative to the retainer and noise due to the slippage are prevented. Problem F is solved. The recess may be replaced by a spring seat having a protrusion which protrudes into an inside diameter of the spring 34.

Since the plurality of springs 34 are bound by the retainer 35 into the spring unit 30, mounting of the springs to the wheel is simple. Problem D is solved by this structure.

Figure 41:
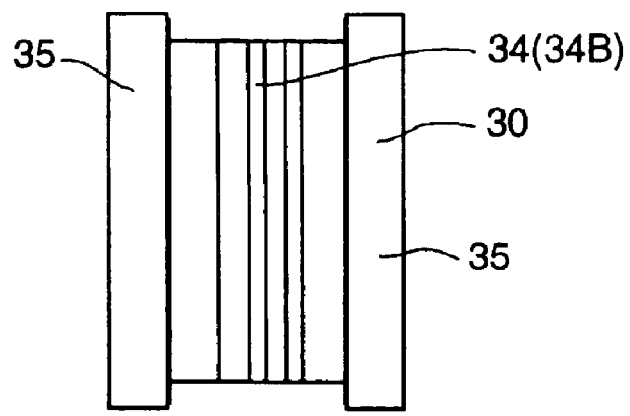
FIG. 41 is a plan view of the leaf spring and the retainer in the case of a leaf spring in compression.
Figure 42:
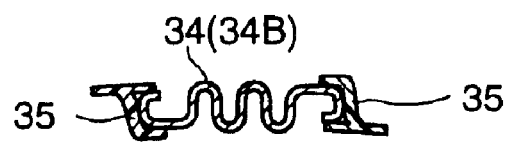
FIG. 42 is a front view of the leaf spring and the retainer of FIG. 41.

In the case where the metal spring 34 is a leaf spring 34B, as illustrated in FIGS. 41 and 42, a retainer 35 having a long recess is used (Embodiment 2). The spring may be a single leaf spring or a plurality of divided leaf springs.

Since the coil spring 34A or the leaf spring 34B is used in a compression state, the spring does not disengage from the retainer 35.

Figure 43:
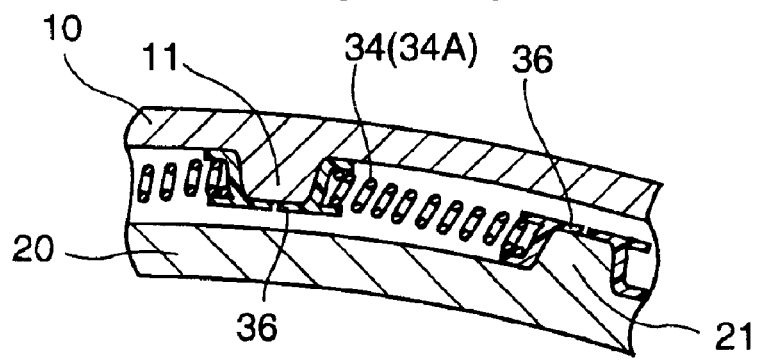
FIG. 43 is a front elevational view of a portion of the wheel with the spring unit having the retainer formed with an extension.

As illustrated in FIG. 43, an extension 36 covering a top surface of the rib 11, 21 is provided to the retainer 35. This extension 36 operates as a stopper to prevent an over stroke, when the spring unit 30 deforms largely while receiving a large load. Further, due to the extension 36, the noise generated when the stoppers hit each other is suppressed. Problem F is solved.

[VII] Structure of the Retainer (in the Case of Tension Spring)

Figure 44:
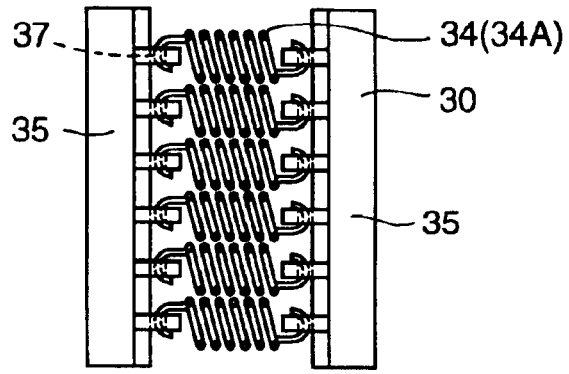
FIG. 44 is a plan view of the coil spring and the retainer in the case of a tension spring.
Figure 45:
FIG. 45 is a front view of the coil spring and the retainer of FIG. 44.

As illustrated in FIGS. 44 and 45, the retainer 35 for the tension spring has a hook 37 where the spring 34 attaches. Since tension operates on the spring 34, the spring is unlikely to dislocate and noise is unlikely to occur. Problem F is solved.

Since the plurality of springs 34 is bound into a single spring unit 30, mounting of the spring unit 30 to the wheel is easy. Problem D is solved.

Figure 46:
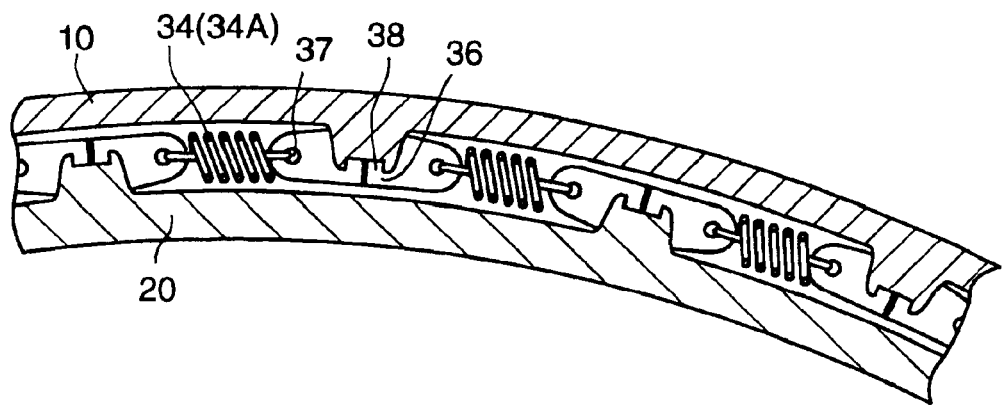
FIG. 46 is a front elevational view of a portion of the wheel with the spring unit having the coil spring in tension and the retainer.

Like the compression coil spring, as illustrated in FIG. 46, an extension 36 is provided to the retainer 35. At an end of the extension 36, a hook 38 is formed. The hook 38 engages a groove formed in the rim thereby bearing the spring force (Embodiment 4).

In the case of the hanger-type, a retainer is not provided, and the plurality of springs 34 hook the hangers 12, 22 directly. Though the mounting process is complex, the number of parts is reduced. Problem D is solved.

[VIII] Absorber

Figure 47:
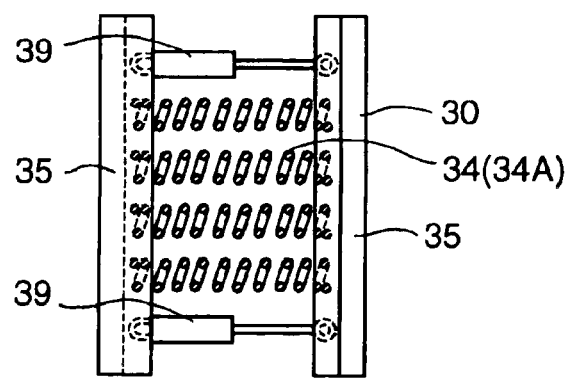
FIG. 47 is a plan view of the spring unit including not only the spring and the retainer but also a damper.
Figure 48:
FIG. 48 is a cross-sectional view of a frictional damper assembled in the spring unit.
Figure 49:
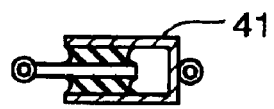
FIG. 49 is a cross-sectional view of a rubber damper assembled in the spring unit.

If damping of the rim 10 is low, a vibration may remain when the tire runs over a bump in a road. Such a remaining vibration can be reduced by replacing one portion of the plurality of springs 34 by an oil damper 39 as illustrated in FIG. 47, a frictional damper 40 as illustrated in FIG. 48, or a rubber damper as illustrated in FIG. 49, so that damping is obtained.

[IX] Mounting Method of the Spring Unit

Figure 50:
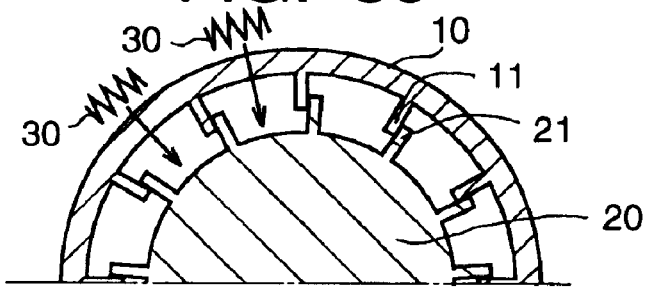
FIG. 50 is a cross-sectional view of a portion of the wheel illustrating a method to assemble the spring unit to the wheel.

The spring unit 30 is prestressed and mounted to the wheel. Mounting of the prestressed spring is more difficult than mounting of a non-prestressed spring. To improve mounting, the following method is taken in the compression spring. As illustrated in FIG. 50, by rotating the rim 10 relative to the disc 20, spring mounting spaces can be widened every two spaces. In that state, a half number of spring units 30 are mounted to the widened spaces. Then, by rotating the rim 10 relative to the disc 20 in the opposite direction, the remaining spring mounting spaces are widened, and the remaining half number of spring units are mounted to the remaining widened spaces.

In a case of the tension spring, by rotating the rim 10 relative to the disc 20, spring mounting spaces can be narrowed every two spaces. In that state, a half number of spring units 30 are mounted to the narrowed spaces. Then, by rotating the rim 10 relative to the disc 20 in the opposite direction, the remaining spring mounting spaces are narrowed, and the remaining half number of spring units are mounted to the remaining narrowed spaces.

[X] Lateral Force Imposed on the Spring-Type Wheel

Since the springs of the spring-type wheel are arranged in the circumferential direction of the wheel, the springs cannot bear a lateral force. To bear the lateral force, the stoppers 31 and 32 are provided as illustrated in FIGS. 35 and 36 (slide-type), in FIG. 37 (rubber bushing-type), and in FIG. 38 (bearing-type).

The following problems still exist with the above proposed mechanisms.

a) Regarding the Slide-Type

A noise is generated at the sliding portion and a vibration generated at the sliding portion is transmitted to the interior of the vehicle. Even if the lubrication ring 33 is used, the effect is limited.

b) Regarding the Rubber Bushing-Type

A cross-sectional area of the spring seat ribs is small and the ribs partially contact the bushing portion. As a result, pressure acting locally on the bushing is extremely large and the bushing may not have a large durability.

c) Regarding the Bearing-Type

The number of parts is large, and the assembly cost and the mounting cost are high.

To solve the above problems, the following axial stopper 62 is proposed here.

a) Rubber Bushing-Type

Figure 51:
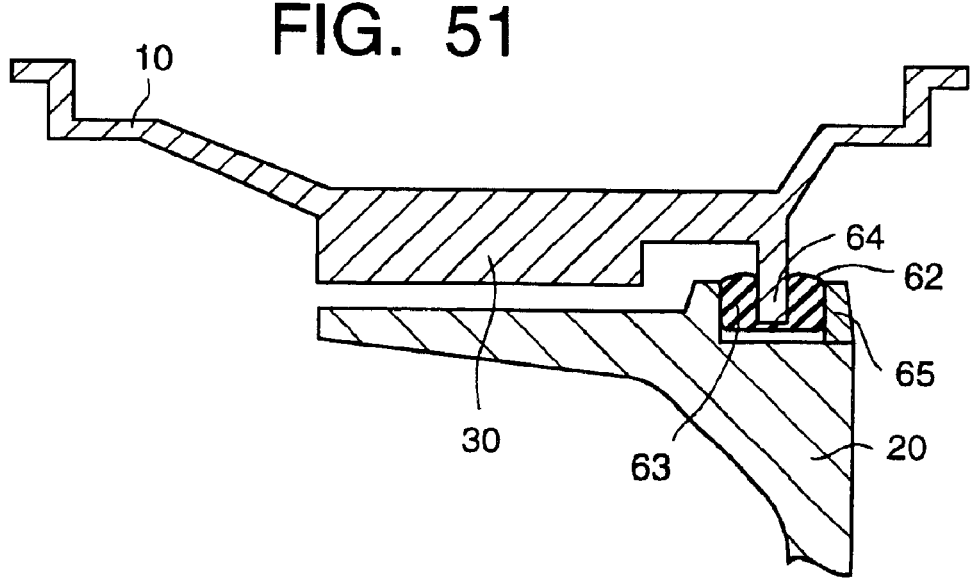
FIG. 51 is a cross-sectional view of a portion of the wheel with a drop portion where the axial movement stopper of the rubber bushing-type is disposed at the axially outboard end of the wheel.

As illustrated in FIG. 51, a circumferentially extending stopper rib 64 is provided in the rim 10, and a stopper bracket 65 is provided in the disc 20. Between the stopper rib 64 and the stopper bracket 65, a rubber bushing 63 is provided. The rubber bushing 63 bears a lateral force (axial force) at the plane of the busing. In order to reduce the number of parts, the stopper ribs 31 and 32 of FIGS. 35 and 36 are collected to one place (the axial end) of the wheel in FIG. 51. By this structure, the rubber bushing 63 can be formed into a single piece having a U-shaped cross section. The U-shaped cross section may be replaced by the double I-shaped cross section including rubber elements of an arbitrary cross section fixed to opposite surfaces of the rib 62.

Since the spring-type elastic wheel is higher in rigidity than that of the rubber-type elastic wheel, a radial displacement between the rim 10 and the disc 20 is small, more particularly, about a half of that of the rubber-type elastic wheel. As a result, the wheel is constructed compact. The stopper 62 is located at an axially outboard end of the wheel where a relatively large space is available and interference with other parts can be prevented.

Figure 52:
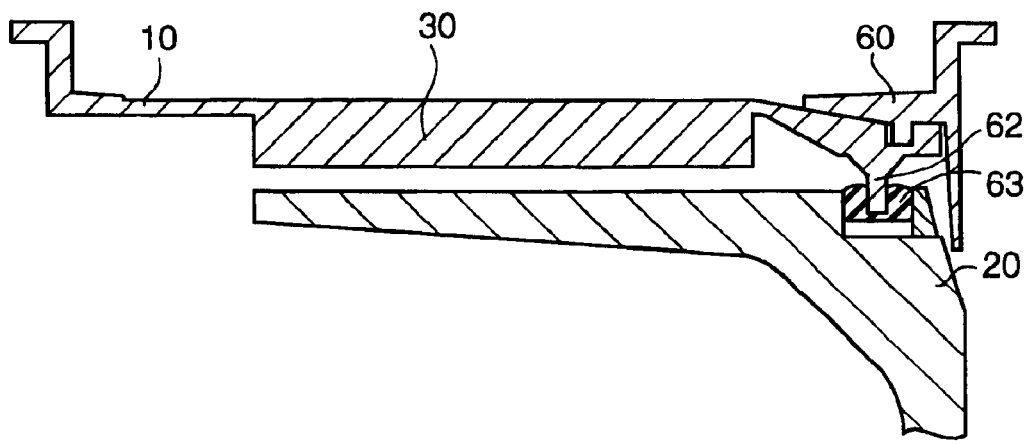
FIG. 52 is a cross-sectional view of a portion of the wheel of a tire laterally mounting-type where the axial movement stopper of the rubber bushing-type is disposed at the axially outboard end of the wheel.

FIG. 52 illustrates a lateral mount wheel, in which the rim has no drop portion and one flange of the rim is detachable from the remaining rim portion so that a tire can be laterally mounted to the rim. The radial distance between the disc 20 and the rim 10 is shortened and the stopper mechanism 62 can be constructed to be compact.

b) Flat Bearing-Type

Figure 53:
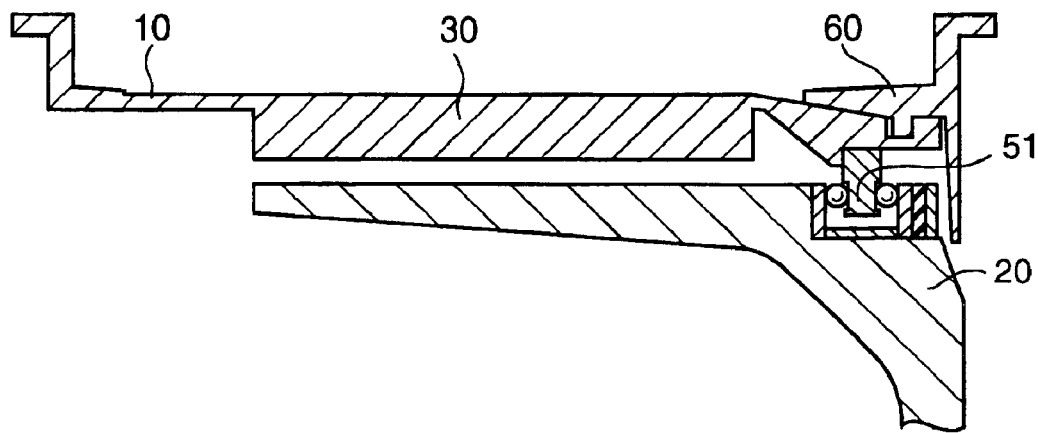
FIG. 53 is a cross-sectional view of a portion of the wheel of a tire laterally mounting-type where the axial movement stopper of the flat bearing-type is disposed at the axially outboard end of the wheel.
Figure 54:
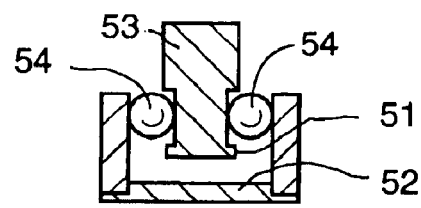
FIG. 54 is a cross-sectional view of the flat bearing.

As illustrated in FIG. 53, the flat bearing 51 is used as the axial stopper 62. As illustrated in FIG. 54, the flat bearing 51 includes the center plate 53, the ball 54 and the annular casing 52 where the center plate 53 and the ball 54 are disposed. Since the up-and-down stroke of the rim is small, the flat bearing 51 is compact and short in the radial direction of the wheel.

[XI] Seal of the Spring-Type Elastic Wheel

Stones, mud, and snow may enter a gap between the rim 10 and the disc 20 or a space in the spring unit 30 itself to stop operation of the spring mechanism and to generate a rotational imbalance of the wheel. Therefore, it is necessary to provide a seal.

Figure 55:
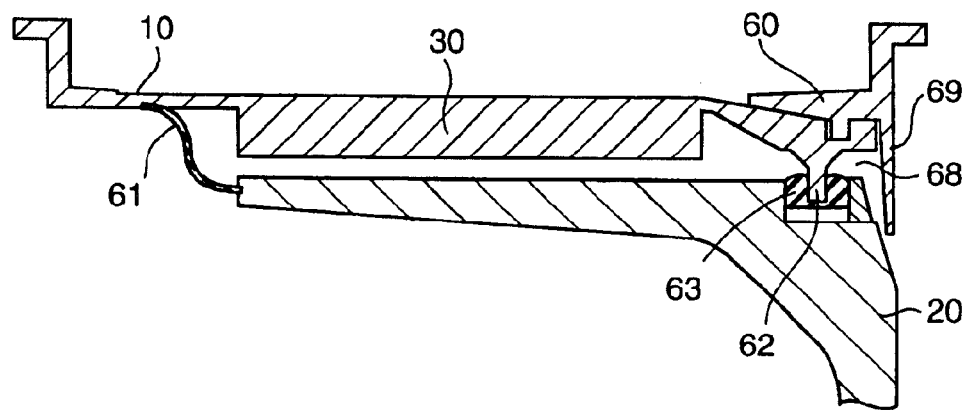
FIG. 55 is a cross-sectional view of a portion of the wheel of a tire laterally mounting-type where the axial movement stopper of the rubber bushing-type is disposed at the axially outboard end of the wheel and a seal is disposed at an axially inboard of the wheel.

To achieve the sealing, an axially inboard seal 61 is provided between the rim 10 and the disc 20 at an axially inboard portion of the wheel. Further, a cover 69 extending radially inwardly from an axial outboard end of the rim 10 is provided. As a result, as illustrated in FIG. 55, a zone 68 where stones, mud, and snow may enter is decreased to a great extent.

Figure 56:
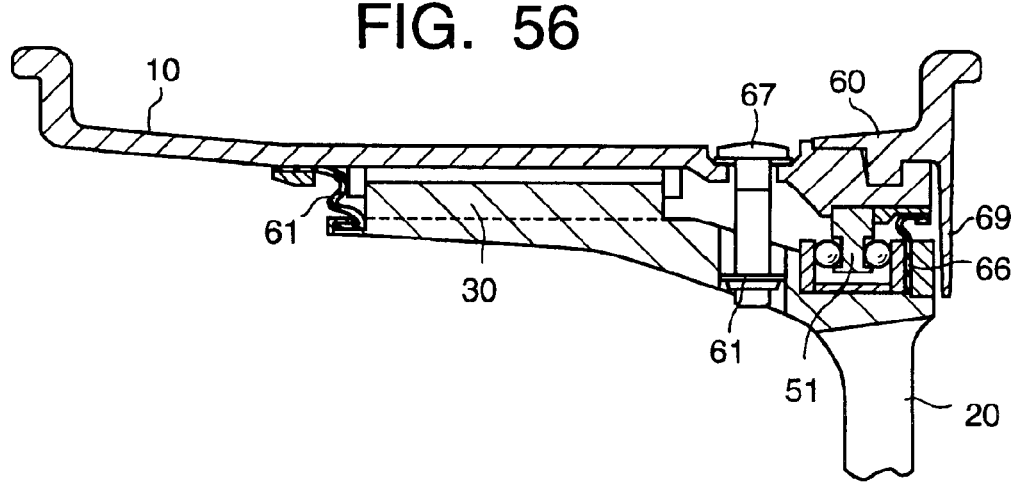
FIG. 56 is a cross-sectional view of a portion of the wheel of a tire laterally mounting-type where the axial movement stopper of the flat bearing-type is disposed at the axially outboard end of the wheel and seals are disposed at an axially inboard of the wheel and at an axially outboard of the wheel.

In the case of the flat bearing 51, since the bearing portion cannot operate as a seal and the axially inboard seal 61 is insufficient to seal the bearing portion from outside, an extension is integrally formed with the cushion 66 for adjusting a pressure imposed on the flat bearing 51, so that the extension of the cushion operates as an axially outboard seal for the bearing portion, as illustrated in FIG. 56. Further, by sealing the air valve 67 by a valve seal 61, the spring unit 30 and the flat bearing 51 are completely sealed and the stones and mud cannot enter the spring unit 30 and the flat bearing 51.

Next, eight embodiments of the present invention (Embodiments I–VIII) will be explained.

Embodiment I (FIGS. 1–6)

In the wheel 1 with the spring unit according to Embodiment I of the present invention, the metal spring 34 of the spring unit 30 is a compression coil spring 34A. Each spring 34A has a load-deformation characteristic illustrated in FIG. 6. Each spring unit 30 has a plurality of coil springs 34A arranged in parallel with each other. The plurality of coil springs 34A are held by the retainer 35 made from synthetic resin at opposite ends of the plurality of coil springs 34A. Each spring unit 30 is prestressed in compression. Each spring unit 30 extends in the circumferential direction of the wheel and is disposed between the rim side rib 11 and the disc side rib 21. One end of the spring unit 30 seats on the rim side rib 11 via the retainer 35, and the other end of the spring unit 30 seats on the disc side rib 21 via the retainer 35. The stopper ribs 31 and 32 are disposed on axially opposite sides of the spring unit 30 with an axial clearance between the axial ends of the spring unit 30 and the stopper ribs 31 and 32. One 32 of the stopper ribs 31 and 32 is welded to the disc 20 after mounting the spring unit 30 onto the disc 20. Between the stopper ribs 31 and 32 and the rim side rib 11, the lubrication ring 33, the rubber bushing 50, or the bearing mechanism 51 is disposed.

Effects of Embodiment I are those already described.

Embodiment II (FIG. 7–12)

In the wheel 1 with the spring unit according to Embodiment II of the present invention, the metal spring 34 of the spring unit 30 is a compression leaf spring 34B. Each spring 34B has a load-deformation characteristic illustrated in FIG. 12. Each end of the leaf spring 34B is held by the retainer 35 made from synthetic resin. Each spring unit 30 is prestressed in compression. Each spring unit 30 extends in the circumferential direction of the wheel and is disposed between the rim side rib 11 and the disc side rib 21. One end of the spring unit 30 seats on the rim side rib 11 via the retainer 35, and the other end of the spring unit 30 seats on the disc side rib 21 via the retainer 35. The stopper ribs 31 and 32 are disposed on axially opposite sides of the spring unit 30 with an axial clearance between the axial ends of the spring unit 30 and the stopper ribs 31 and 32. One 32 of the stopper ribs 31 and 32 is welded to the disc 20 after mounting the spring unit 30 onto the disc 20. Between the stopper ribs 31 and 32 and the rim side rib 11, the lubrication ring 33, the rubber bushing 50, or the bearing mechanism 51 is disposed.

Effects of Embodiment II are those already described.

Figure 1:
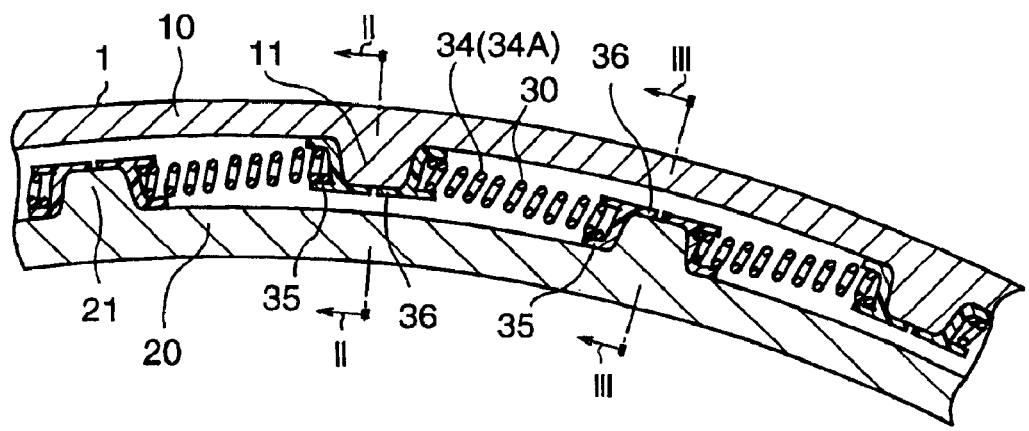
FIG. 1 is an elevational view of a wheel with a spring unit according to Embodiment I of the present invention.
Figure 2:
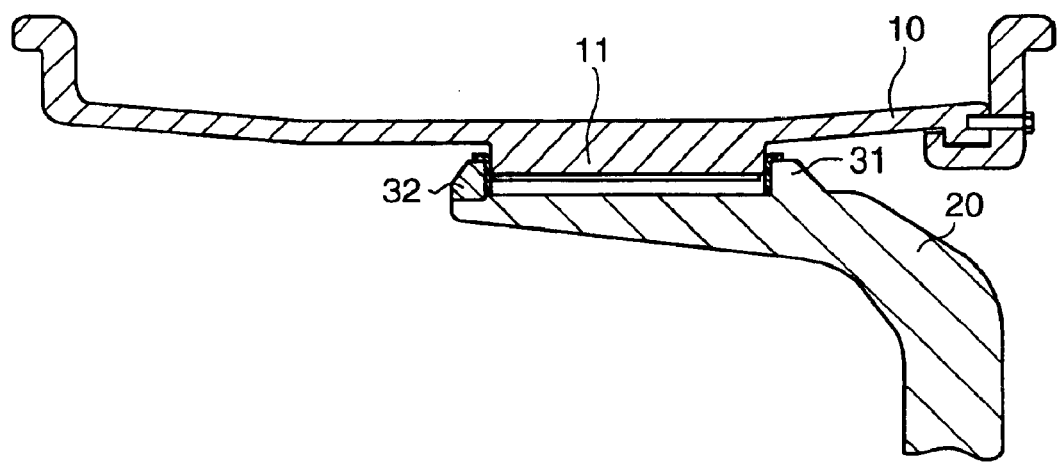
FIG. 2 is a cross-sectional view taken along line II—II of FIG. 1.
Figure 3:
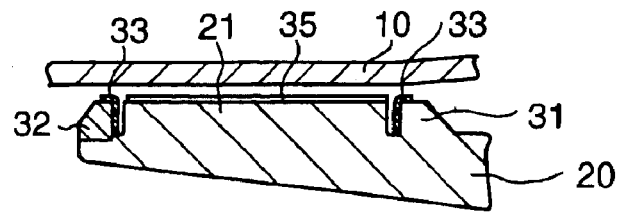
FIG. 3 is a cross-sectional view taken along line III—III of FIG. 1.
Figure 4:
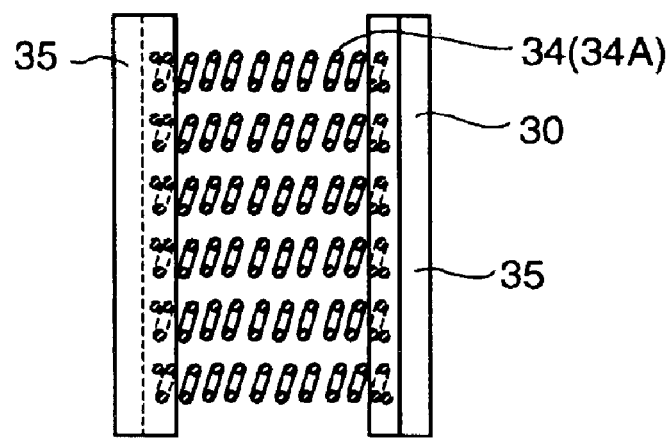
FIG. 4 is a plan view of a spring unit of the wheel of FIG. 1.
Figure 5:
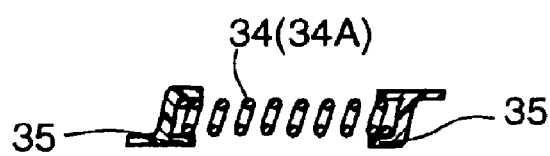
FIG. 5 is a front elevational view of the spring unit of FIG. 4.
Figure 6:
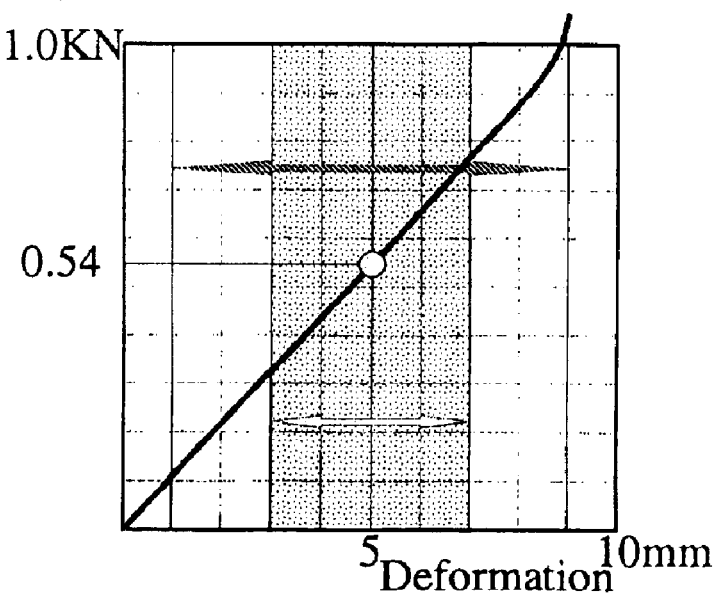
FIG. 6 is a graph illustrating a load-deformation characteristic of the spring of FIG. 4.
Figure 7:
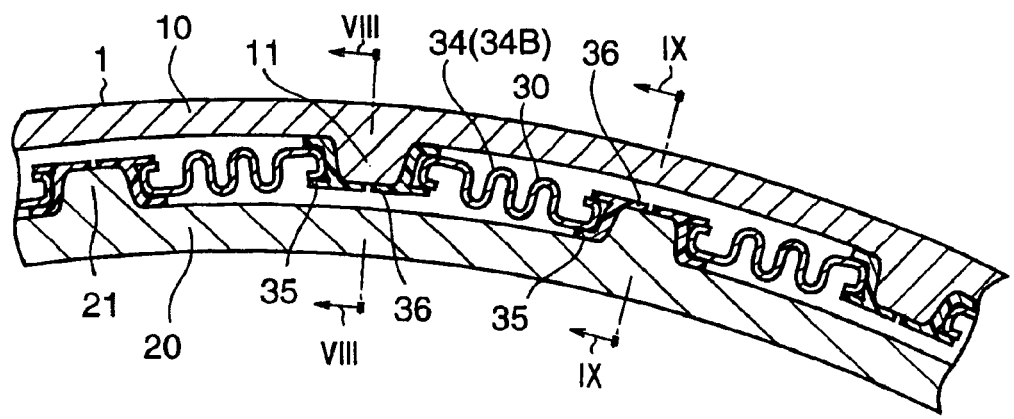
FIG. 7 is an elevational view of a wheel with a spring unit according to Embodiment II of the present invention.
Figure 8:
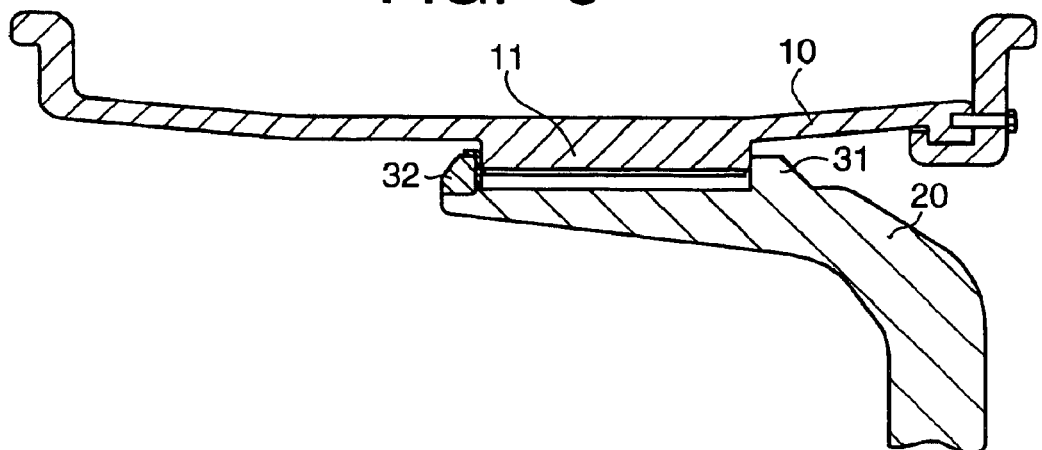
FIG. 8 is a cross-sectional view taken along line VIII—VIII of FIG. 7.
Figure 9:
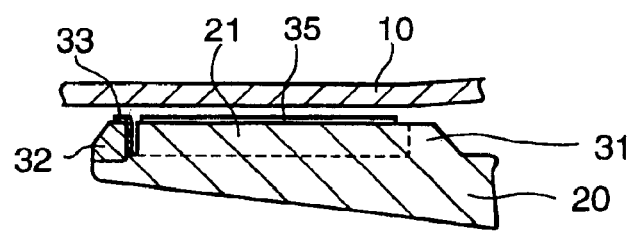
FIG. 9 is a cross-sectional view taken along line IX—IX of FIG. 7.
Figure 10:
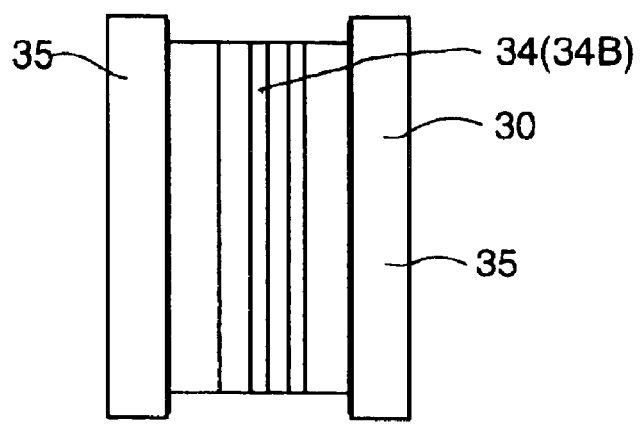
FIG. 10 is a plan view of a spring unit of the wheel of FIG. 7.
Figure 11:
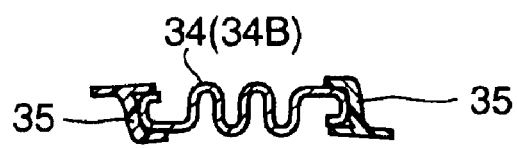
FIG 11 is a front elevational view of the spring unit of FIG. 10.
Figure 12:
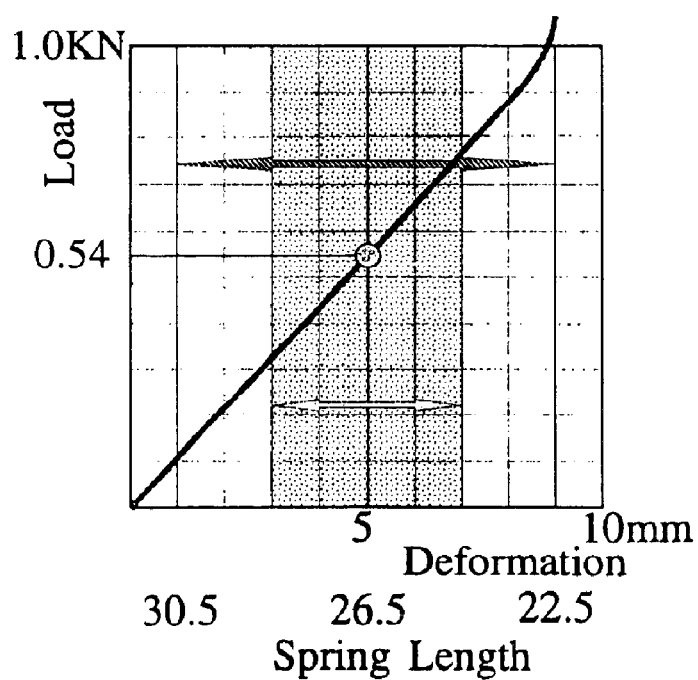
FIG. 12 is a graph illustrating a load-deformation characteristic of the spring of FIG. 10.
Figure 13:
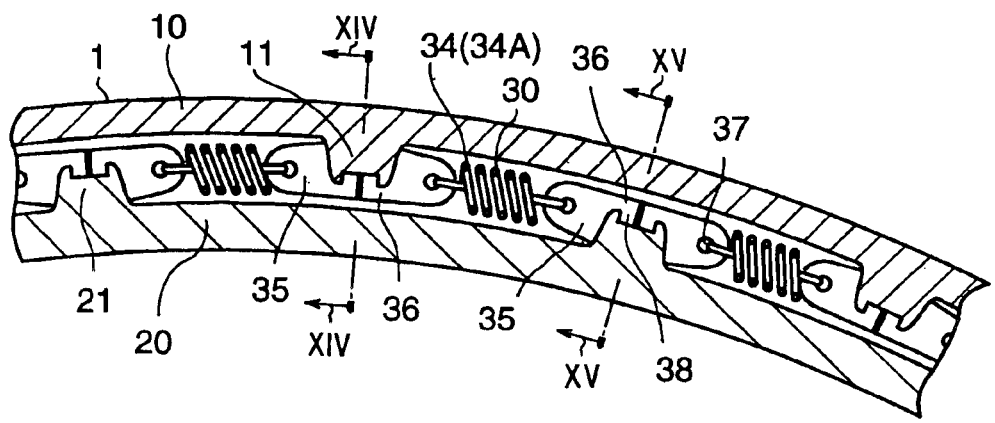
FIG. 13 is an elevational view of a wheel with a spring unit according to Embodiment III of the present invention.
Figure 14:
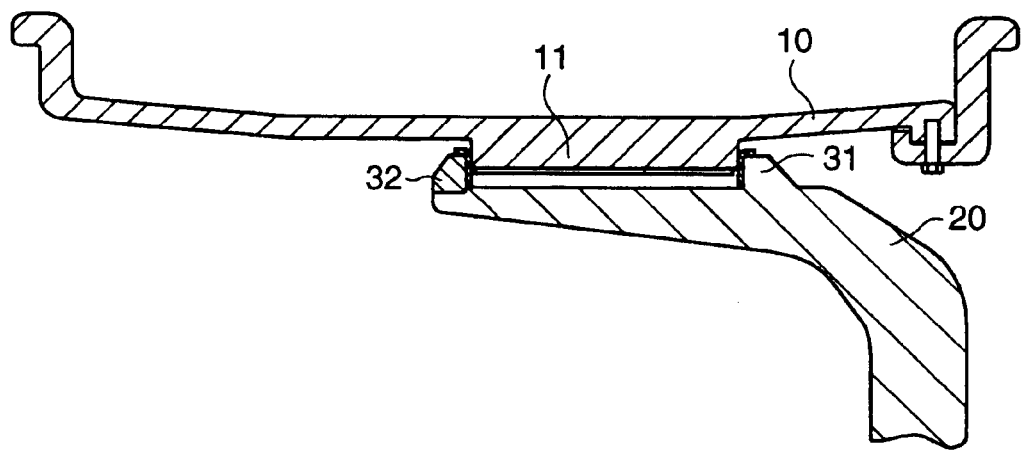
FIG. 14 is a cross-sectional view taken along line XIV—XIV of FIG. 13.
Figure 15:
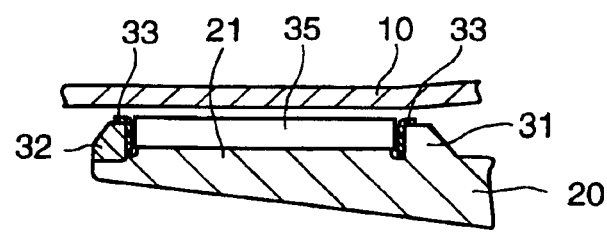
FIG. 15 is a cross-sectional view taken along line XV—XV of FIG. 13.

Embodiment III (FIGS. 13–15)

In the wheel 1 with the spring unit according to Embodiment III of the present invention, the metal spring 34 of the spring unit 30 is a tension coil spring 34A. Each spring unit 30 has a plurality of coil springs 34A arranged in parallel with each other. Each end of each coil spring 34A is hooked to the retainer 35 made from synthetic resin. Each spring unit 30 is prestressed in tension. Each spring unit 30 extends in the circumferential direction of the wheel and is disposed between the rim side rib 11 and the disc side rib 21. One end of the spring unit 30 is hooked to the retainer 35 coupled to the rim side rib 11, and the other end of the spring unit 30 is hooked to the retainer 35 coupled to the disc side rib 21. Each end of the coil spring 34A is hooked to the retainer 35 at a hooking hole 37 formed in the retainer 35, and the retainer 35 is coupled to the rim side rib 11 or the disc side rib 21 at hooking protrusion 38 formed in the retainer 35. The stopper ribs 31 and 32 are disposed on axially opposite sides of the spring unit 30 with an axial clearance between the axial ends of the spring unit 30 and the stopper ribs 31 and 32. One 32 of the stopper ribs 31 and 32 is welded to the disc 20 after mounting the spring unit 30 onto the disc 20. Between the stopper ribs 31 and 32 and the rim side rib 11, the lubrication ring 33, the rubber bushing 50, or the bearing mechanism 51 is disposed.

Effects of Embodiment III are those already described.

Figure 16:
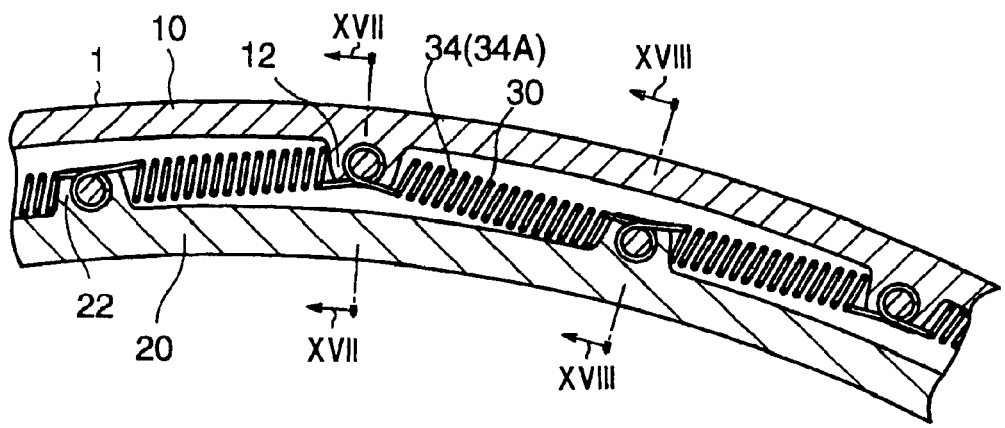
FIG. 16 is an elevational view of a portion of a wheel with a spring unit according to Embodiment IV of the present invention.
Figure 17:
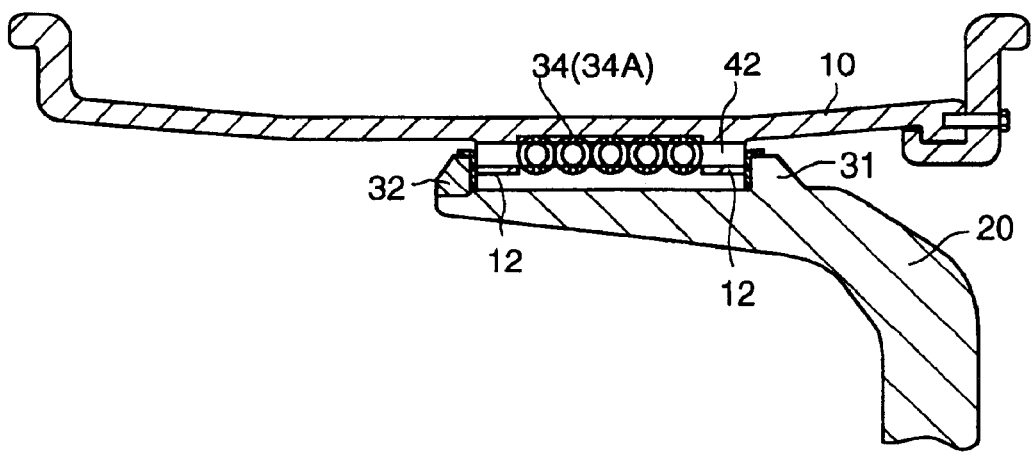
FIG. 17 is a cross-sectional view taken along line XVII—XVII of FIG. 16.
Figure 18:
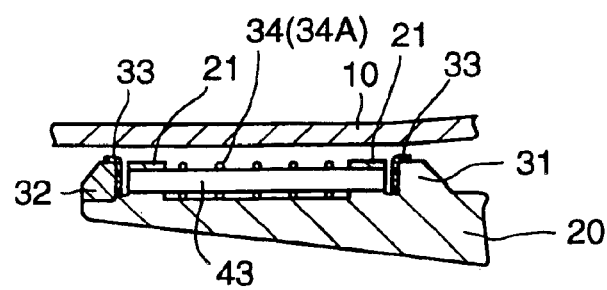
FIG. 18 is a cross-sectional view taken along line XVIII—XVIII of FIG. 16.
Figure 19:
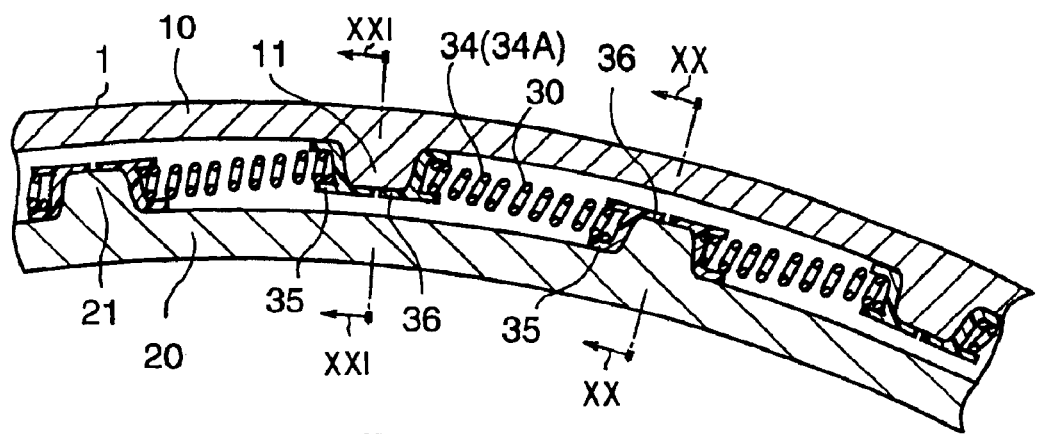
FIG. 19 is an elevational view of a portion of a wheel with a spring unit according to Embodiment V of the present invention.
Figure 20:
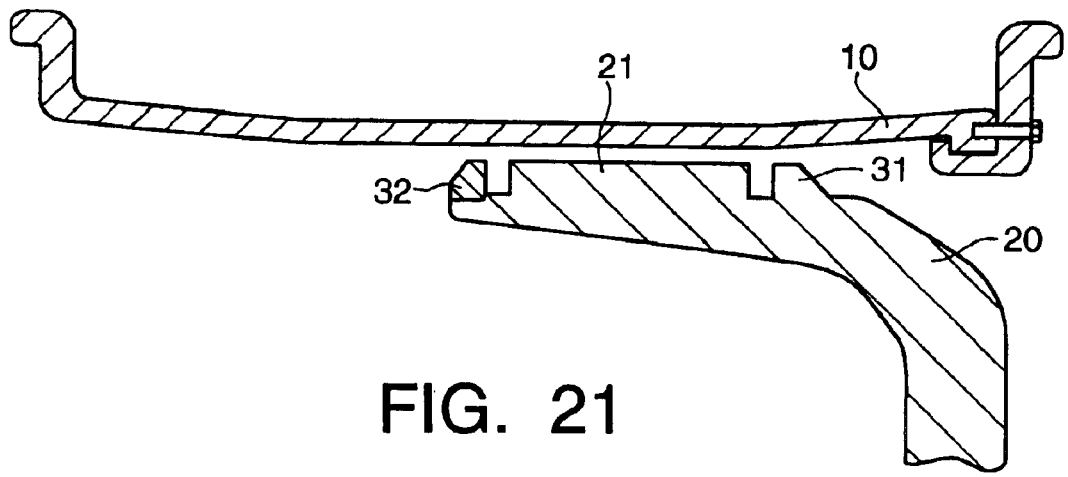
FIG. 20 is a cross-sectional view taken along line XX—XX of FIG. 19.
Figure 21:
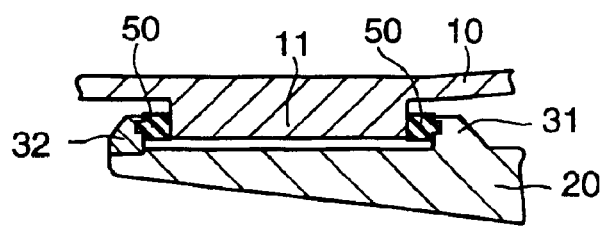
FIG. 21 is a cross-sectional view taken along line XXI—XXI of FIG. 19.
Figure 22:
FIG. 22 is a side view of a rubber bushing of the spring unit of FIG. 21.
Figure 23:
FIG. 23 is a front view of the rubber bushing of FIG. 22.
Figure 24:
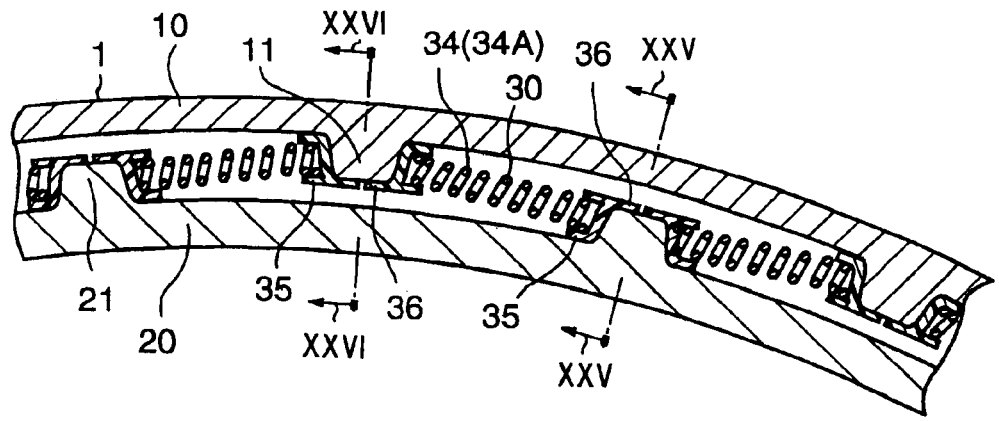
FIG. 24 is a front elevational view of a portion of a wheel with a spring unit according to Embodiment VI of the present invention.
Figure 25:
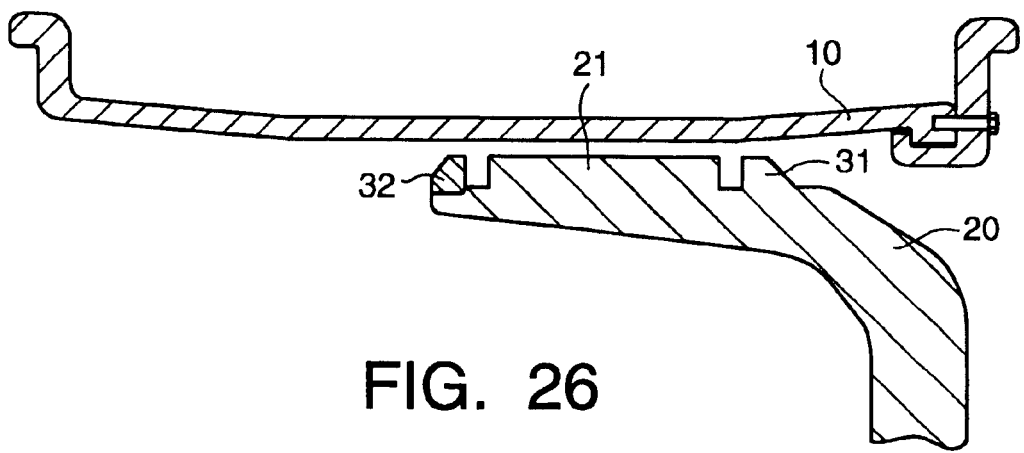
FIG. 25 is a cross-sectional view taken along line XXV—XXV of FIG. 24.
Figure 26:
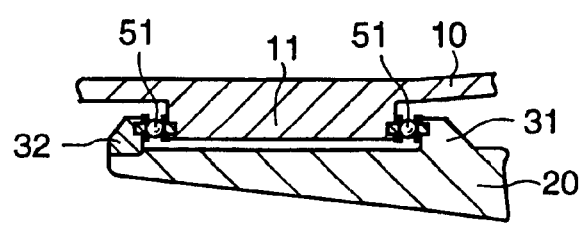
FIG. 26 is a cross-sectional view taken along line XXVI—XXVI of FIG. 24.
Figure 27:
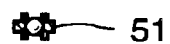
FIG. 27 is a side view of a ball mechanism of the spring unit of FIG. 26.
Figure 28:
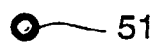
FIG. 28 is a front view of the ball mechanism of FIG. 27.

Embodiment IV (FIGS. 16–18)

In the wheel 1 with the spring unit according to Embodiment IV of the present invention, the metal spring 34 of the spring unit 30 is a tension coil spring 34A. Each spring unit 30 has a plurality of coil springs 34A arranged in parallel with each other. One end of each coil spring 34A is hooked to the hanger 42 of the hanger bracket 12 fixed to the rim 10 and the other end of each coil spring 34A is hooked to the hanger 43 of the hanger bracket 22 fixed to the disc 20. There is no retainer unlike Embodiments I–III. Each spring unit 30 is prestressed in tension. Each spring unit 30 extends in the circumferential direction of the wheel and is disposed between the rim side rib 11 and the disc side rib 21. The stopper ribs 31 and 32 are disposed on axially opposite sides of the spring unit 30 with an axial clearance between the axial ends of the spring unit 30 and the stopper ribs 31 and 32. One 32 of the stopper ribs 31 and 32 is welded to the disc 20 after mounting the spring unit 30 onto the disc 20. Between the stopper ribs 31 and 32 and the rim side rib 11, the lubrication ring 33, the rubber bushing 50, or the bearing mechanism 51 is disposed.

Effects of Embodiment IV are those already described.

Embodiment V (FIGS. 19–23)

In the wheel 1 with the spring unit according to Embodiment V of the present invention, the metal spring 34 of the spring unit 30 is a compression coil spring 34A. Each spring unit 30 has a plurality of coil springs 34A arranged in parallel with each other. The plurality of coil springs 34A are held by retainers 35 made from synthetic resin at opposite ends of the plurality of coil springs 34A. Each spring unit 30 is prestressed in compression. Each spring unit 30 extends in the circumferential direction of the wheel and is disposed between the rim side rib 11 and the disc side rib 21. One end of the spring unit 30 seats on the rim side rib 11 via the retainer 35, and the other end of the spring unit 30 seats on the disc side rib 21 via the retainer 35. The stopper ribs 31 and 32 are disposed on axially opposite sides of the spring unit 30 with an axial clearance between the axial ends of the spring unit 30 and the stopper ribs 31 and 32. One 32 of the stopper ribs 31 and 32 is welded to the disc 20 after mounting the spring unit 30 onto the disc 20. Between the stopper ribs 31 and 32 and the rim side rib 11, the rubber bushing 50 is disposed.

Effects of Embodiment V are those already described.

Embodiment VI (FIGS. 24–28)

In the wheel 1 with the spring unit according to Embodiment VI of the present invention, the metal spring 34 of the spring unit 30 is a compression coil spring 34A. Each spring unit 30 has a plurality of coil springs 34A arranged in parallel with each other. The plurality of coil springs 34A are held by retainers 35 made from synthetic resin at opposite ends of the plurality of coil springs 34A. Each spring unit 30 is prestressed in compression. Each spring unit 30 extends in the circumferential direction of the wheel and is disposed between the rim side rib 11 and the disc side rib 21. One end of the spring unit 30 seats on the rim side rib 11 via the retainer 35, and the other end of the spring unit 30 seats on the disc side rib 21 via the retainer 35. The stopper ribs 31 and 32 are disposed on axially opposite sides of the spring unit 30 with an axial clearance between the axial ends of the spring unit 30 and the stopper ribs 31 and 32. One 32 of the stopper ribs 31 and 32 is welded to the disc 20 after mounting the spring unit 30 onto the disc 20. Between the stopper ribs 31 and 32 and the rim side rib 11, the ball bearing mechanism 51 is disposed.

Effects of Embodiment VI are those already described.

Figure 29:
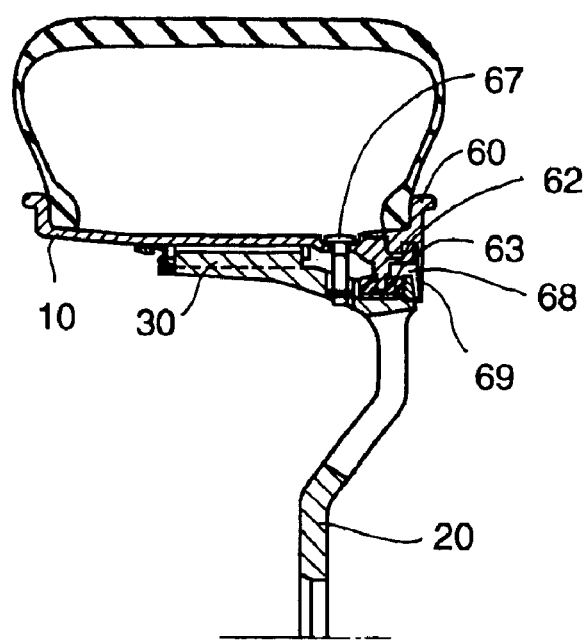
FIG. 29 is a cross-sectional view of a portion of a wheel with a spring unit according to Embodiment VII of the present invention.
Figure 30:
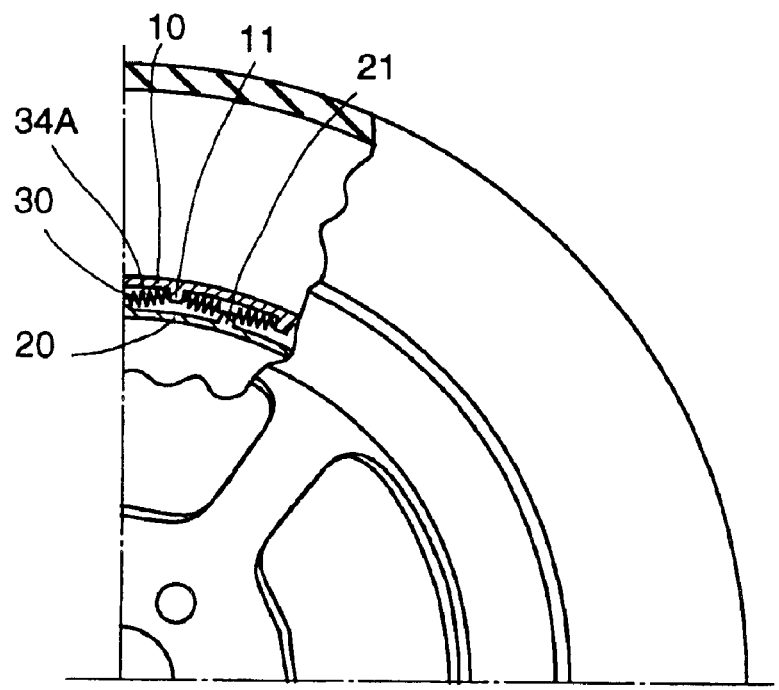
FIG. 30 is a front elevational view of a portion of the wheel of FIG. 29.

Embodiment VII (FIGS. 29 and 30)

In the wheel 1 with the spring unit according to Embodiment VII of the present invention, the metal spring 34 of the spring unit 30 is a compression coil spring 34A. Each spring 34A has a load-deformation characteristic illustrated in FIG. 6. Each spring unit 30 has a plurality of coil springs 34A arranged in parallel with each other. The plurality of coil springs 34A are held by retainers 35 made from synthetic resin at opposite ends of the plurality of coil springs 34A. Each spring unit 30 is prestressed in compression. Each spring unit 30 extends in the circumferential direction of the wheel and is disposed between the rim side rib 11 and the disc side rib 21. One end of the spring unit 30 seats on the rim side rib 11 via the retainer 35, and the other end of the spring unit 30 seats on the disc side rib 21 via the retainer 35.

The wheel 1 with the spring unit 30 includes an axial movement stopper 62 with the rubber bushing 63 for stopping a relative axial movement between the rim 10 and the disc 20. An axially end portion of the rim 10 is detachable from a remaining portion of the rim 10 so that a tire can be laterally mounted onto the remaining portion of the rim. The wheel 1 with the spring unit 30 has a large static spring constant and a displacement in the radial direction of the wheel is small. As a result, the relative movement between the rim 10 and the disc 20 can be absorbed by the rubber bushing 63. Further, the axially inboard seal 61 is provided. Since the cover 69 is provided and operates as an axially outboard seal to some extent, stones are unlikely to enter the zone 68.

Embodiment VIII (FIG. 31)

In the wheel 1 with the spring unit according to Embodiment VIII of the present invention, the spring unit 30 includes the metal spring 34 and has the same structures as those of Embodiment VIII of the present invention.

The wheel 1 with the spring unit 30 includes an axial movement stopper 62 with the flat bearing 51 for stopping a relative axial movement between the rim 10 and the disc 20. An axially end portion of the rim 10 is detachable from a remaining rim portion so that a tire can be laterally mounted onto the remaining portion of the rim. Because the flat bearing 51 is provided, a perfect seal is necessary. The seals include the axially inboard seal 61, the axially outboard seal 61 constructed of the extension of the pressure adjustment cushion rubber 66, the seal 61 around the air valve 67, and the cover 69.

According to the present invention, the following technical advantages are obtained:

First, since the spring units 30 are directed circumferentially and arranged in the annular space between the rim 10 and the disc 20, the gap between the rim 10 and the disc 20 can be small. Further, since the spring unit 30 includes the metal spring 34, a high reliability is obtained. Further, there is no vulcanized rubber, and the cost is low.

Second, since the rim side rib 11 and the disc side rib 21 engage each other in the rotational direction of the wheel, even if the spring unit 30 is broken, a drive or brake torque can be transmitted to assure a fail-safe mechanism.

Third, in the case where the stopper ribs 31 and 32 are provided on axially opposite sides of the rim side rib 11 and the disc side rib 21, the relative movement between the rim 10 and the disc 20 in the axial direction of the wheel is restricted so that the steering characteristic of the wheel can be improved.

Fourth, in the case where the lubrication rings 33 are disposed between the stopper ribs 31 and 32 and the rim side rib 11, fretting and noise generation at the contact portion between the stopper ribs 31 and 32 and the rim side rib 11 can be suppressed.

Fifth, in the case where the rubber bushings 50 are disposed between the stopper ribs 31 and 32 and the rim side rib 11, fretting and noise generation at the contact portion between the stopper ribs 31 and 32 and the rim side rib 11 can be suppressed.

Sixth, in the case where the ball mechanisms 51 are disposed between the stopper ribs 31 and 32 and the rim side rib 11, fretting and noise generation at the contact portion between the stopper ribs 31 and 32 and the rim side rib 11 can be suppressed.

Seventh, in the case where the axial movement stopper 62 is provided, problems about controllability, noise, and breakage of the rubber spring generated in the rubber spring-type elastic wheel can be suppressed.

Last, in the case where the axial movement stopper 62 and the seal 61 are provided, problems generated in the rubber spring-type elastic wheel can be suppressed, and stones, mud, and snow are prevented from entering the spring unit and the flat bearing.

Although the present invention has been described with reference to specific exemplary embodiments, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A wheel with a spring unit comprising:
   a rim including a rim side rib protruding radially inwardly;
   a disc spaced from said rim to form an annular space between said rim and said disc, said disc including a disc side rib protruding radially outwardly;
   a plurality of spring units directed circumferentially and arranged in said annular space, each of said plurality of spring units including a metal spring, each of said plurality of spring units having a first end engaging said rim side rib and a second, opposite end engaging said disc side rib;
   wherein said rim side rib includes either one of a rib formed integrally with said rim and a first member fixed to said rim, and said disc side rib includes either one of a rib formed integrally with said disc and a second member fixed to said disc, said rim side rib and said disc side rib being engageable with each other in a wheel rotational direction, and
   wherein said disc includes a pair of stopper ribs spaced from said rim side rib in an axial direction of said wheel and said disc side rib and arranged on opposite sides of said rim side rib and said disc side rib in said axial direction of said wheel.

2. A wheel according to claim 1, further comprising a ring for lubrication disposed between each of said pair of stopper ribs and said rim side rib.

3. A wheel according to claim 1, further comprising a rubber bushing disposed between each of said pair of stopper ribs and said rim side rib.

4. A wheel according to claim 1, further comprising a ball bearing mechanism including a ball disposed between each of said pair of stopper ribs and said rim side rib.

5. A wheel according to claim 1, wherein the wheel is a lateral mount wheel in which said rim has no drop portion and one flange of said rim is detachable so that a tire can be laterally mounted to said rim.

* * * * *